July 11, 1933.　　　W. B. THIEMANN　　　1,917,673
SCRAPER ATTACHMENT FOR TRACTOR WHEELS
Filed Dec. 15, 1930
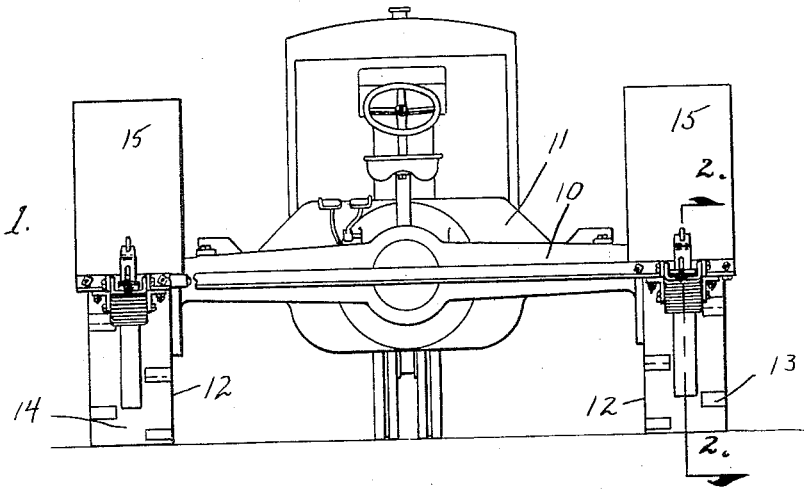
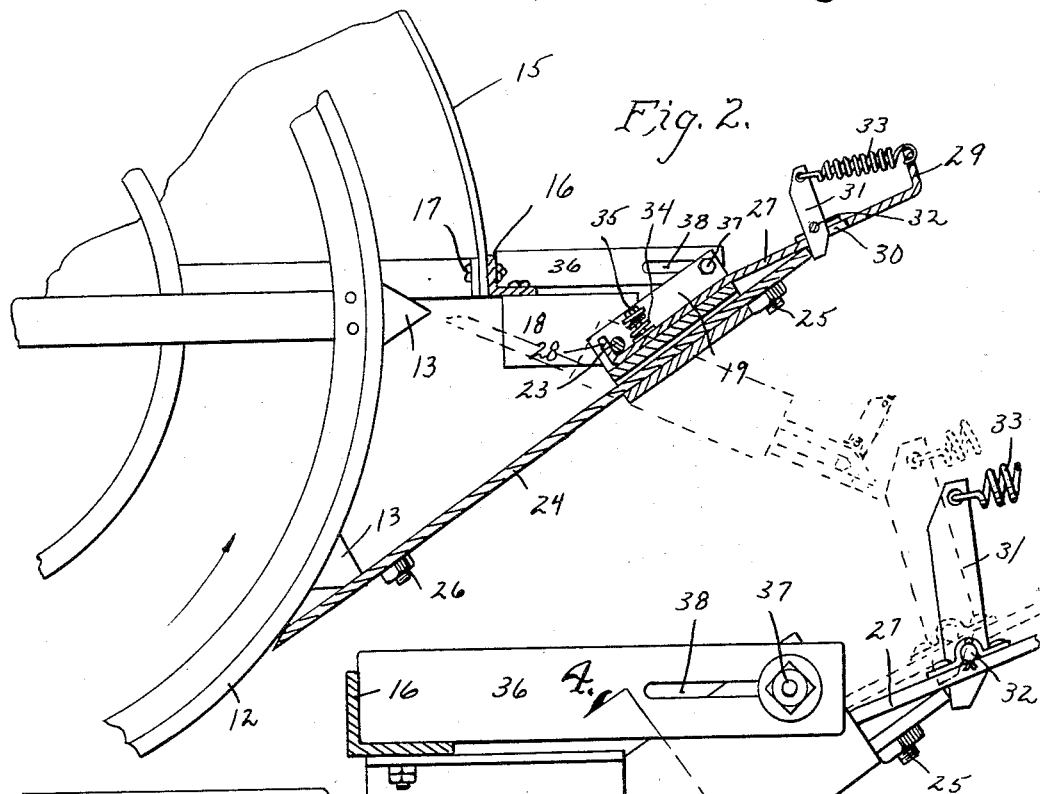
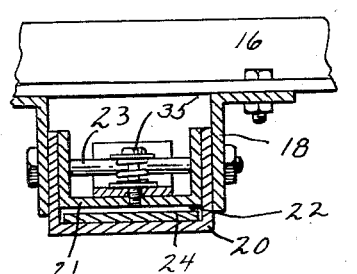
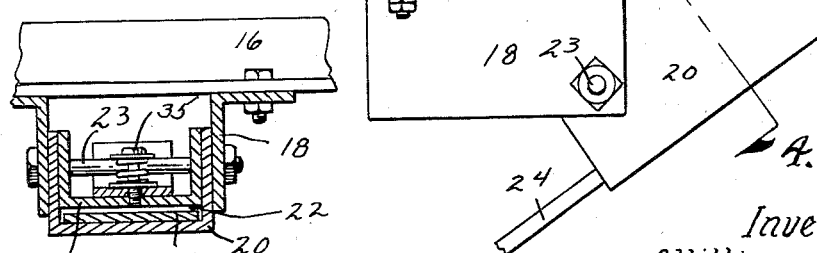
Inventor
William B. Thiemann
by Craig n Hague Attys Patented July 11, 1933

1,917,673

UNITED STATES PATENT OFFICE

WILLIAM B. THIEMANN, OF ALBERT CITY, IOWA

SCRAPER ATTACHMENT FOR TRACTOR WHEELS

Application filed December 15, 1930. Serial No. 502,388.

This invention relates to improvements in detachable scraper devices designed for use in scraping mud from the rims of traction wheels, and particularly to that type of wheels having spaced circumferential rows of traction lugs, carried by said rims.

Considerable difficulty has been experienced in providing scraper attachments for tractor wheels inasmuch as a tremendous power is usually applied to the wheels, causing the scraper attachment to be torn loose from its anchorage in case the scraper blade should become caught on frozen material or tightly lodged stones.

It is, therefore, the object of my invention to provide a scraper attachment of simple, durable and inexpensive construction which may be easily and quickly applied to the ordinary tractor wheels of the type above described, and when so applied the scraper blade may be automatically released when predetermined power is applied to the blade, whereby the scraper blade will be released without injury; and To provide in connection therewith means whereby the blade may be easily and quickly reset to an operative position.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a rear view of a tractor showing the manner in which my improved scrapers are applied thereto.

Figure 2 is an enlarged detail sectional view taken on the line 2—2 of Figure 1.

Figure 3 is a side elevation of the scraper guide and the adjustable means for limiting the pivotal movement of said guide, and also showing by dotted lines the latch supporting plate moved to its elevated position.

Figure 4 is a detail sectional view taken on the line 4—4 of Figure 3.

Referring to the accompanying drawing I have used the reference numeral 10 to indicate the rear axle housing of a tractor frame 11, which is of ordinary construction. Said tractor is provided with traction wheels 12, each of which is provided with mud lugs 13. The lugs 13 are arranged in circumferential rows spaced apart to provide a space 14 between them. The usual shields 15 are also provided.

Supported on the lower edge of the rear end of the shields 15 is an angle iron 16 by means of suitable bolts 17. Said iron 16 projects preferably across the rear end of the tractor a slight distance back of the lugs 12 in the manner clearly illustrated in Figure 2.

Secured to each end of the angle iron 16 is a pair of spaced angles 18, which form a bracket for pivotally supporting what I shall term a scraper blade guide 19. The said guide 19 is formed of a pair of short channel members 20 and 21. The channel 21 is supported inside of the channel 20 in such manner that a slot 22 is provided between said channel members. The adjacent flanges of said channels are secured together. A bolt 23 projects through the lower ends of the flanges of said channel and into the outwardly extending flanges of the angles 18. Said bolt forms a pivot for the guide 19.

Slidably mounted in the slot 22 is a scraper blade 24 of considerable length, and designed to have its inner end engage the rim of the wheel 12 in a tangent manner, as illustrated in Figure 2, with the upper end of the blade projecting outwardly from the upper end of the guide. A bolt 25 is provided for limiting the downward movement of the blade 24, and a bolt 26 is provided for limiting the upward movement of said blade. Said blade is free to slide longitudinally in said slot.

Supported between the flanges of the channel 21 is a latch supporting plate 27, having its lower end supported beneath the bolt 23 and provided with an upwardly extending flange 28. Said flange 28 holds the plate 27 against rearward movement. The outer end of the plate 27 extends beyond the outer end of the blade 24 and is provided with an upwardly extending flange 29.

The plate 27 is also provided with a slot 30 for receiving the lower end of a latch bar 31, which is pivotally connected to said plate 27 by means of a pivot 32, with the lower end of the bar 31 resting against the rear end of the blade 24.

A spring 33 connects the upper end of the bar 31 with the upper end of the flange 29, and provides means for yieldably holding the latch 31 in the position illustrated in Figure 2, in such manner that a considerable pressure needs to be applied to the blade 24 longitudinally before said blade 24 is permitted to move rearwardly. When the said pressure is greater than the tension of the spring 33, then the lower end of the lever 31 will move rearwardly, permitting the blade 24 to be moved rearwardly through the slot 29, at which time the rear end of the plate 27 will be elevated, as shown by dotted lines in Figure 3, against the action of a spring 34 supported by a bolt 35 mounted in the web of the channel 21. This provides means whereby the tension of the spring 33 is such as to support the scraper blade in operative relation with the rim of the wheel 12 under ordinary working conditions.

In case a stone or frozen mud should be encountered by the blade to such extent that injury is likely to result to said blade, then the blade 24 is permitted to move rearwardly, the inner end being permitted to swing upwardly on account of the pivotally mounted guide 19, until the rear end of the blade 24 is below the front end, at which time the said blade will be moved outwardly by gravity until the bolt 26 engages the forward edge of the channel 20.

After the obstruction has been removed from the wheel, the operator then grasps the spring 34 and moves it upwardly to swing the blade to its normal inclined position, and at the same time pulls the plate 27 upwardly and forwardly against the action of the spring 34 to release the lower end of the lever 31 from the upper surface of the blade 24, at which time the blade is then free to slide to operative position by gravity. The spring 33 is then released, permitting the outer end of the plate 27 to swing downwardly and permitting the lower end of the lever 31 to move into position against the rear end of the blade 24.

In this connection it should be noted that when the latch 31 is out of engagement with the rear end of the blade 24, the lower end of said latch 31 is held against forward movement by engaging the lower end of the slot 30, so that as the plate 27 is lowered into position, the latch bar is free to move into position against the rear end of the blade 24.

For preventing the lower end of the blade 24 from swinging downwardly, I have provided adjustable bars 36 secured to the outside faces of the flanges of the channel 20, and having their inner ends designed to engage the angle 16, and thus means is provided whereby the upper end of the guide 19 is limited against upward and inward swinging movement. These bars 36 are adjustably mounted by means of bolts 37 projecting through slots 38 in said bars 36.

By adjustably mounting the bars 36 to the guide 19 means is provided whereby the lower end of the blade may also be supported a slight distance from the rim of the wheel if so desired, to permit rivet heads or other obstructions to pass above the scraper blade.

The lower end of the scraper blade 24 is designed to be supported in the spaces 14 between the two rows of lugs, thus providing means whereby not only will the mud be removed from between the rows of lugs, but also from between the lugs themselves, inasmuch as usually a considerable amount of fibrous material, such as weeds, straw and the like, is gathered with the mud which pulls the mud from between the lugs. By this arrangement I have provided means whereby the traction wheels will be automatically cleaned, and whereby the said scraper blade will be automatically moved to an inoperative position in case frozen material is encountered or other obstructions likely to cause injury to the blade.

I have found by actual practice that a considerable amount of power is saved by scraping the mud from the wheels while in operation, and further that the lugs are always maintained in clean condition, whereby they not only serve as traction means, but also as means for spading and loosening the soil.

I claim as my invention:

1. A scraper attachment for traction wheels comprising a support, a scraper guide on said support, a scraper slidably mounted in said guide having its inner end adapted to be supported in operative relation with the wheel rim and its outer end projecting beyond said guide, a pivoted latch supporting plate parallel with the outer end of said blade to swing toward and from said blade, yieldable means for holding said latch supporting plate inwardly, a pivoted latch carried by said plate having one end designed to engage the outer end of said blade, and yieldable means for supporting the blade engaging end of said latch against outward movement.

2. A scraper attachment for traction wheels comprising a support, a scraper guide pivoted to said support, a scraper slidably mounted in said guide having its inner end adapted to be supported in operative relation with the wheel rim and its outer end projecting beyond said guide, a pivoted latch supporting plate parallel with the outer end of said blade to swing toward and from said blade, yieldable means for holding said latch supporting plate inwardly, a pivoted latch carried by said plate having one end designed to engage the outer end of said blade, yieldable means for supporting the blade engaging end of said latch against outward movement, and means for limiting the pivotal movement of said guide in one direction.

3. A scraper attachment for traction wheels comprising a support arranged transversely of the movement of said traction wheels, parallel and rearwardly spaced bracket members, a scraper blade supporting member comprising a pair of channel irons, one being mounted within the other to form a space between the web portions of said channel members, means for pivotally connecting the lower ends of said channel members with said bracket members, a scraper blade slidably mounted in said guide to move toward and from the traction wheels, the upper end of said blade terminating a slight distance above the upper end of said blade support, a latch bar plate pivotally supported adjacent to the upper surface of said blade support, yieldable means for holding the latch bar plate inwardly, a pivoted latch carried by said plate having one end designed to engage the outer end of said blade, and yieldable means for supporting the blade engaging end of said latch against outward movement.

4. A scraper attachment for traction wheels comprising a support arranged transversely of the movement of said traction wheels, parallel and rearwardly spaced bracket members, a scraper blade supporting member comprising a pair of channel irons, one being mounted within the other to form a space between the web portions of said channel members, means for pivotally connecting the lower ends of said channel members with said bracket members, a scraper blade slidably mounted in said guide to move toward and from the traction wheels, the upper end of said blade terminating a slight distance above the upper end of said blade support, a latch bar plate pivotally supported adjacent to the upper surface of said blade support, yieldable means for holding the latch bar plate inwardly, a pivoted latch carried by said plate having one end designed to engage the outer end of said blade, yieldable means for supporting the blade engaging end of said latch against outward movement, adjustable stop devices carried by the upper end of said blade support for supporting the scraper blade in operative position adjacent to the traction wheels.

WILLIAM B. THIEMANN.